(No Model.)
T. A. EDISON.
REGULATOR FOR DYNAMO ELECTRIC MACHINES.
No. 264,663. Patented Sept. 19, 1882.
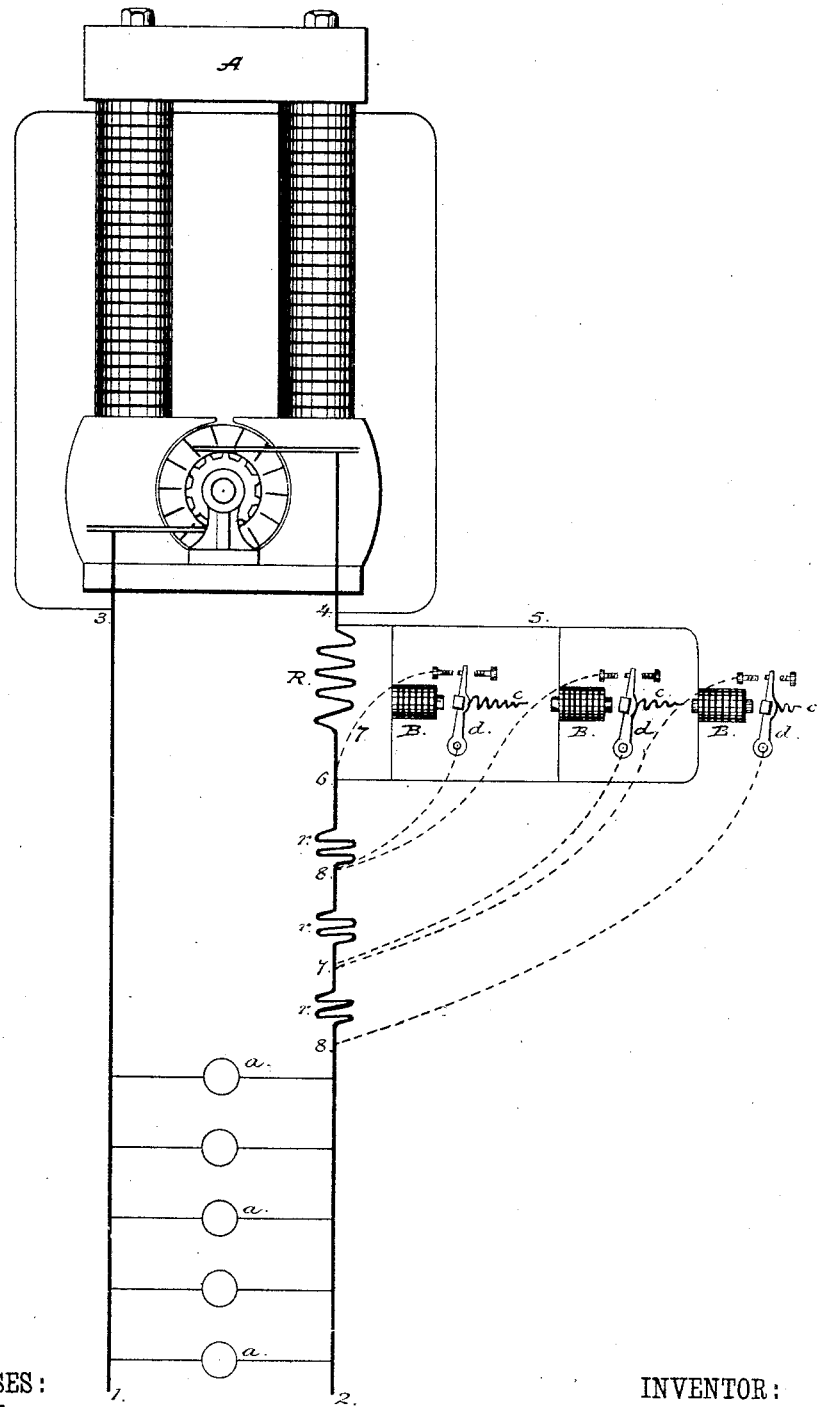
WITNESSES:
E. C. Rowland
F. W. Howard
INVENTOR:
T. A. Edison
BY Rich'd N. Dyer,
ATTORNEY.

UNITED STATES PATENT OFFICE.

THOMAS A. EDISON, OF MENLO PARK, NEW JERSEY.

REGULATOR FOR DYNAMO-ELECTRIC MACHINES.

SPECIFICATION forming part of Letters Patent No. 264,663, dated September 19, 1882.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in the Regulation of Dynamo or Magneto Electric Machines, (Case No. 411;) and I do hereby declare that the following is a full and exact description of the same, reference being had to the accompanying drawing, and to the letters of reference marked thereon.

The object of this invention is to produce means for regulating the generation of current by a dynamo or magneto electric machine by automatically varying the resistance of the main circuit leading therefrom, according to variations in the number of translating devices in circuit in the multiple-arc system supplied by the machine. To do this I place in one or both of the main conductors a series of resistances, around each of which is formed a shunt-circuit, a portion of which is formed by a pivoted armature-lever. Each of these armature-levers is actuated by an electro-magnet, and these electro-magnets are preferably placed in multiple arc across a shunt-circuit around another resistance in the main line, though they might be placed in series in such shunt. The armature-levers are retracted by springs, the springs of the different levers varying in strength; or other means may be provided whereby different amounts of current will be required to cause each magnet to attract its armature, such as placing each armature at a different distance from its magnet, winding the magnets in different ways, &c. The forward movement of an armature closes the shunt-circuit in which it is placed, and so cuts out of circuit one of the resistances in the main line. When the number of translating devices in circuit is increased the current in the shunt-circuit, which contains the magnets, becomes greater, and one or more of the magnets attracts its armature, which, being drawn forward against a contact-point, short-circuits a resistance in the main line, and thereby allows a greater amount of current to pass from the machine to the translating devices supplied thereby. This may be better comprehended by reference to the annexed drawing, which illustrates my invention diagrammatically.

A is the field-magnet of a dynamo-electric machine, energized by the derived circuit 3 4 from the main conductors 1 2. On these main conductors electric lamps or other translating devices, *a a*, are placed in multiple arc: A resistance, R, is placed in the main conductor 2, around which is formed a shunt, 5 6. In multiple-arc circuits across this shunt are placed electro-magnets B B B, each having an armature, *d*, retracted by a spring, *c*, the springs differing in tension. Each armature is included in a shunt-circuit, 7 8, around a resistance, *r*, in the main line. As more and more translating devices are placed in circuit the armatures *d* are successively drawn forward by the increased energy of their magnets B, and the resistances *r r* are successively thrown out of circuit. A reverse operation takes place as the number of translating devices is decreased.

What I claim is—

1. The combination, with a dynamo or magneto electric machine and translating devices arranged in multiple arc, of a series of resistances in the main circuit from said generator and a number of independent devices actuated by the current generated, for successively throwing such resistances into or out of circuit, according to variations in the number of said translating devices, substantially as set forth.

2. The combination, with a dynamo or magneto electric machine and translating devices arranged in multiple arc, of a series of resistances in the main circuit and a series of electro-magnets in a shunt from said main circuit, each magnet being provided with an armature-lever, the motion of which opens and closes a shunt around one of the said resistances in the main line, and the armatures being so arranged as to operate successively, substantially as set forth.

This specification signed and witnessed this 1st day of May, 1882.

THOMAS A. EDISON.

Witnesses:
H. W. SEELY,
P. B. WILBER.